(12) United States Patent
LiHsiao-Yi et al.

(10) Patent No.: US 7,652,969 B2
(45) Date of Patent: Jan. 26, 2010

(54) HOLOGRAPHIC OPTICAL ACCESSING SYSTEM

(75) Inventors: Hsiao-Yi LiHsiao-Yi, Hsinchu (TW); Hsi-Fu Shih, Hsinchu (TW)

(73) Assignee: Lite-On It Corp., Taipei (TW)

( * ) Notice: Subject to any disclaimer, the term of this patent is extended or adjusted under 35 U.S.C. 154(b) by 502 days.

(21) Appl. No.: 11/736,616

(22) Filed: Apr. 18, 2007

(65) Prior Publication Data

US 2008/0031117 A1   Feb. 7, 2008

(30) Foreign Application Priority Data

Aug. 1, 2006   (TW) .............................. 95128205 A

(51) Int. Cl.
*G11B 7/00* (2006.01)
(52) U.S. Cl. ...................................... 369/103
(58) Field of Classification Search ................. 369/103; 359/10, 11, 30, 31
See application file for complete search history.

(56) References Cited

U.S. PATENT DOCUMENTS

| 6,909,529 | B2 * | 6/2005 | Curtis | 359/30 |
| 7,082,093 | B1 * | 7/2006 | Magnitskii et al. | 369/94 |
| 7,525,894 | B2 * | 4/2009 | Tsukagoshi et al. | 369/103 |
| 7,576,900 | B2 * | 8/2009 | Lan et al. | 369/103 |

* cited by examiner

*Primary Examiner*—Thang V Tran
(74) *Attorney, Agent, or Firm*—WPAT, PC; Justin King

(57) ABSTRACT

A holographic optical accessing system includes a light source for emitting a light beam; an optical assembly module for receiving the light beam and generating a signal beam and a reference beam that are parallel to each other rather than overlap with each other, and have the same first polarization state; a lens module for focusing the signal beam and the reference beam on a focal point at the same time; and a storage medium for recording the focal point. The optical assembly module includes at least a data plane for displaying image information so that the signal beam contains the image information.

27 Claims, 15 Drawing Sheets

HOLOGRAPHIC OPTICAL ACCESSING SYSTEM

FIELD OF THE INVENTION

The present invention relates to a holographic optical accessing system, and more particularly to a structure of related optical devices within the holographic optical accessing system for data reading and data recording.

BACKGROUND OF THE INVENTION

The optical accessing system has been widely used for data reading and data recording in present. However, because of the material characteristics of the storage medium within the optical accessing system and the accuracy of accessing method applied in the optical accessing system, the capacity of data can be recorded in an optical disc by a conventional optical disc accessing technology is limited. Therefore, an optical holography technology (or holographic data storage technology) is developed for raising the recording density on an optical disc.

FIG. 1 depicts a diagram of a holographic optical accessing system 100, wherein the holographic optical accessing system 100 includes: a signal beam 12, a data plane 14, a reference beam 16, a storage medium 18, a data beam 22, and a detecting apparatus 20.

When the data recording is processed in the holographic optical accessing system 100, a light beam, e.g. a laser beam emitted from a laser, is split into two light beams by a beam splitter (not shown), wherein one of the two light beams is regarded as the signal beam 12 after the light beam is emitted to the data plane 14, because the image information presented on the data plane 14 is also contained in the signal beam 12; another light beam split from the laser beam is regarded as the reference beam 16.

During the process of data recording, the signal beam 12 and the reference beam 16 are both focused on a focus point 24 of the storage medium 18 at the same time, wherein the storage medium 18 can be a photosensitive interface, such as photopolymer. When the signal beam 12 and the reference beam 16 are both focused on the focal point at the same time, the interference stripes are formed on the focus point 24, so as the image information which is contained in the signal beam 12 is recorded on the focal point 24 as a grating, and the data recording process is completed.

During the process of data reading in the holographic optical accessing system 100, only the reference beam 16 is focused on the focus point 24. After the reference beam 16 is focused on the focal point 24, a data beam 22 is then generated and propagates through the rail of the signal beam 12. The data, recorded on the focal point 24, is read out, so as the image information originally stored on the data plane 14 is also contained in the data beam 22. When the data beam 22 is received by the detecting apparatus 20 placed on the path of the data beam 22, the image information originally written on the data plane 14 will be projected on the detecting apparatus 20 and the data reading process is completed.

In addition, the data plane 14 is a SLM (Spatial Light Modulator), and the SLM can be a DMD (Digital Micromirror Device), a LCD (Liquid Crystal Display), or a LCOS (Liquid Crystal on Silicon), wherein the DMD, LCD, or LCOS are all composed by a plurality of displaying units arranged as an array, and image information can be presented by these displaying units with light states or dark states. The detecting apparatus 20 can be a CMOS (Complementary Metal-Oxide Semiconductor) or a CCD (Charge Coupled Device).

In the holographic optical accessing system 100, data is recorded in the storage medium 18 via the signal beam 12 and the reference beam 16 focused on the focal point 24 at the same time, wherein the signal beam 12 and the reference beam 16 are on-axis with each other. FIG. 2 illustrates the signal beam 12 and the reference beam 16 processing a data recording in the conventional holographic optical accessing system 100, wherein the signal beam 12 and the reference beam 16 have the same optical axis 15 and is so called on-axis. That means both the signal beam 12 and the reference beam 16 are contained in a light beam. As depicted in FIG. 2, when the signal beam 12 and the reference beam 16 are focused on the focal point 24 of the storage medium 18 at the same time via the lens module 19, the interference stripes are formed on the focal point 24, so as the data recording process is completed. However, because the signal beam 12 and the reference beam 16 are both further reflected back from the storage medium 18 to the lens module 19 via the same optical path, a crosstalk interference could be introduced by a conjugate light of the signal beam 12 and the conjugate light of the reference beam 16, so as the data recording accuracy is affected. Therefore, providing a holographic optical accessing system for fixing the above-described problem is the purpose of the present invention.

SUMMARY OF THE INVENTION

The object of the present invention is to provide a holographic optical accessing system for a signal beam and a reference beam within the system are parallel to each other rather than overlap with each other during the process of data recording, and for a data beam reflected to a detecting apparatus by a plurality of micro-array devices.

The present invention provides a holographic optical accessing system including: a light source for emitting a first light beam; a beam splitter for splitting the first light beam into a second light beam and a third light beam, wherein a polarization state of the second light beam is different from the polarization state of the third light beam; an optical assembly module for converting the second light beam and the third light beam to have the same polarization state and making the optical axes of the second light beam and the third light beam parallel to each other rather than overlap with each other during a process of data recording, and for only outputting the third light beam during a process of data reading; a lens module for focusing the second light beam and the third light beam on a focal point at a same time during the process of data recording, and for only focusing the third light beam on the focal point during the process of data reading; a storage medium for forming the focal point in the storage medium during the process of data recording, and for converting the third light beam to a data beam during the process of data reading; and an awl-shaped interface for reflecting the data beam and inputting the data beam to the optical assembly module from the opposite direction of the second light beam.

The present invention further provides a holographic optical accessing system including: a light source, for emitting a first light beam, wherein the first light beam can be distinguished to a second light beam and a third light beam, and a polarization state of the second light beam is different from the polarization state of the third light beam; a half-wave plate, for passing the second light beam and the third light beam when the half-wave plate is rotated to a first angle during a process of data recording, and for only passing the third light beam when the half-wave plate is rotated to a second angle during a process of data reading; a beam splitter, for splitting the second light beam and the third light beam during the process of data recording, and for outputting the third light beam during the process of data reading; an optical assembly module, for converting the second light beam and the third light beam to the same first polarization state and making the second light beam and the third light beam light beams parallel to each other rather than overlapped with each other during the process of data recording, and for only outputting the third light beam during the process of data reading; a lens module, for focusing the second light beam and the third light beam on a focal point at the same time during the process of data recording, and for focusing the third light beam on the focal point during the process of data reading; a storage medium, for forming the focal point in the storage medium during the process of data recording, and for converting the third light beam to a data beam during the process of data reading; and an awl-shaped interface, for reflecting the data beam and inputting the data beam into the optical assembly module from the opposite direction of the second light beam.

The present invention further provides a holographic optical accessing system including: a light source, for emitting a light beam; an optical assembly module, for receiving the light beam to generate a signal beam and a reference beam, wherein the signal beam and the reference beam are parallel to each other rather than overlap with each other, and the signal beam and the reference beam have a first polarization state; a lens module, for focusing the signal beam and the reference beam on a focal point at the same time; and a storage medium, for recording the focal point; wherein the optical assembly module includes at least a data plane for displaying an image information and makes the signal beam contain the image information.

The present invention further provides a holographic optical accessing system including: a light source, for emitting a light beam; an optical assembly module, for receiving the light beam and converting the light beam to a signal beam and a reference beam during a process of data recording, and for receiving the light beam and converting the light beam to a reference beam during a process of data reading, wherein the signal beam and the reference beam are parallel to each other rather than overlap with each other, and the signal beam and the reference beam have a first polarization state; a lens module, for focusing the signal beam and the reference beam on a focal point during the process of data recording, and for focusing the reference beam on the focal point during the process of data reading; a storage medium, for forming the focal point in the storage medium during the process of data recording, and for converting the reference beam to a data beam during the process of data reading; and an awl-shaped interface, for reflecting the data beam and inputting the data beam to the optical assembly module from the opposite direction of the signal beam.

The present invention further provides a holographic optical accessing system including: a light source, for emitting a light beam; an optical assembly module, for receiving the light beam and converting the light beam to a signal beam and a reference beam during a process of data recording, and for receiving the light beam and converting the light beam to a reference beam during a process of data reading, wherein the signal beam and the reference beam are parallel to each other rather than overlap with each other, and the signal beam and the reference beam have a first polarization state; a lens module, for focusing the signal beam and the reference beam on a focal point during the process of data recording, and for focusing the reference beam on the focal point during the process of data reading; a storage medium, for forming the focal point in the storage medium during the process of data recording, and for converting the reference beam to a data beam during the process of data reading; and an awl-shaped interface, for reflecting the data beam and inputting the data beam to the optical assembly module from the opposite direction of the signal beam.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

A holographic optical accessing system of the present invention will be explained and described by five corresponding embodiments, but only the behaviors of the light beams within the processes of data reading and data recording will be explained and illustrated in diagrams, other related structures, e.g. the light source for emitting laser beam or hardware controlling interface will be ignored.

Figure 1:
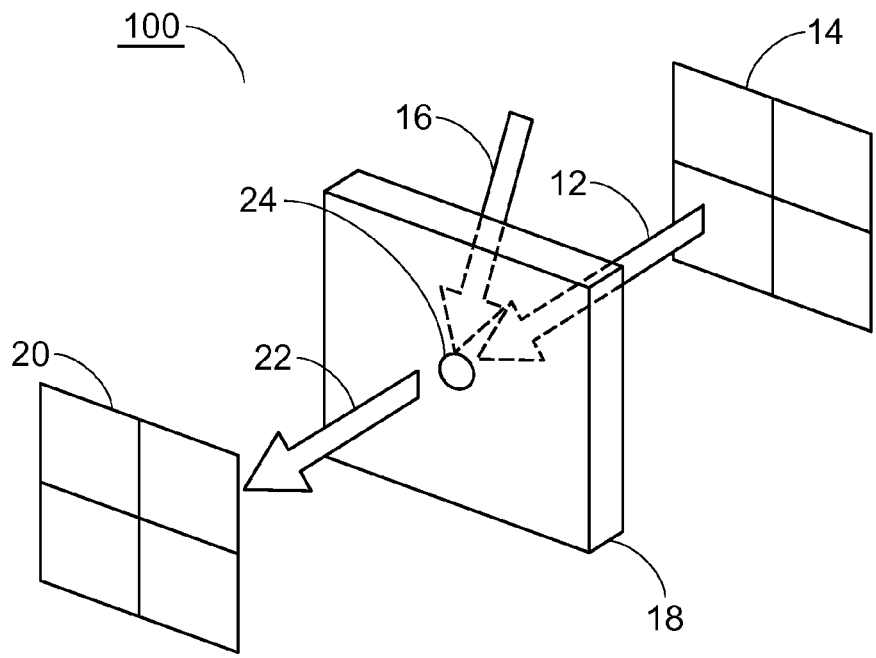
FIG. 1 is a diagram of a holographic optical accessing system 100.
Figure 2:
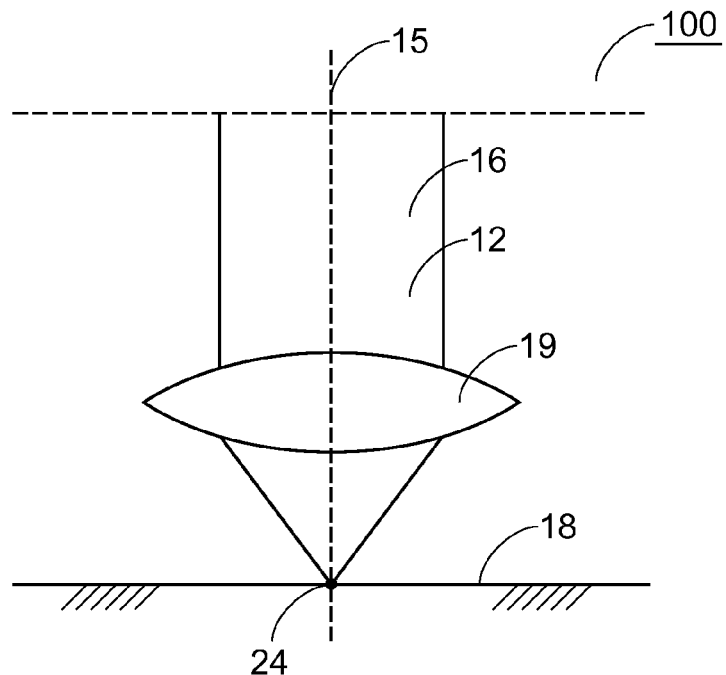
FIG. 2 is a diagram illustrating a signal beam and a reference beam processing a data recording in the holographic optical accessing system.
Figure 3A:
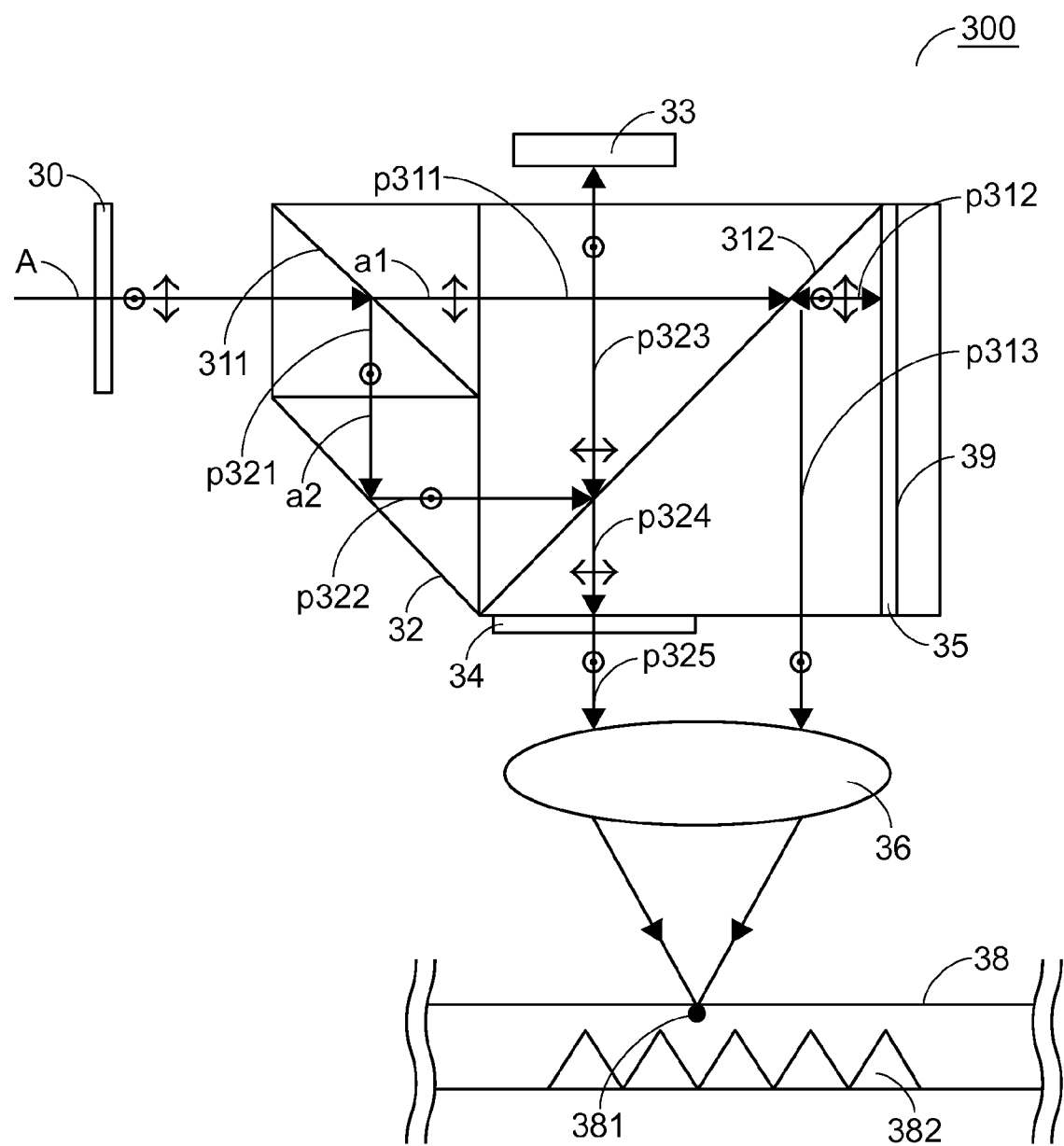
FIGS. 3A and 3B respectively illustrate two diagrams of the processes of data recording and data reading in a holographic optical accessing system in the first embodiment of the present invention.
Figure 3B:
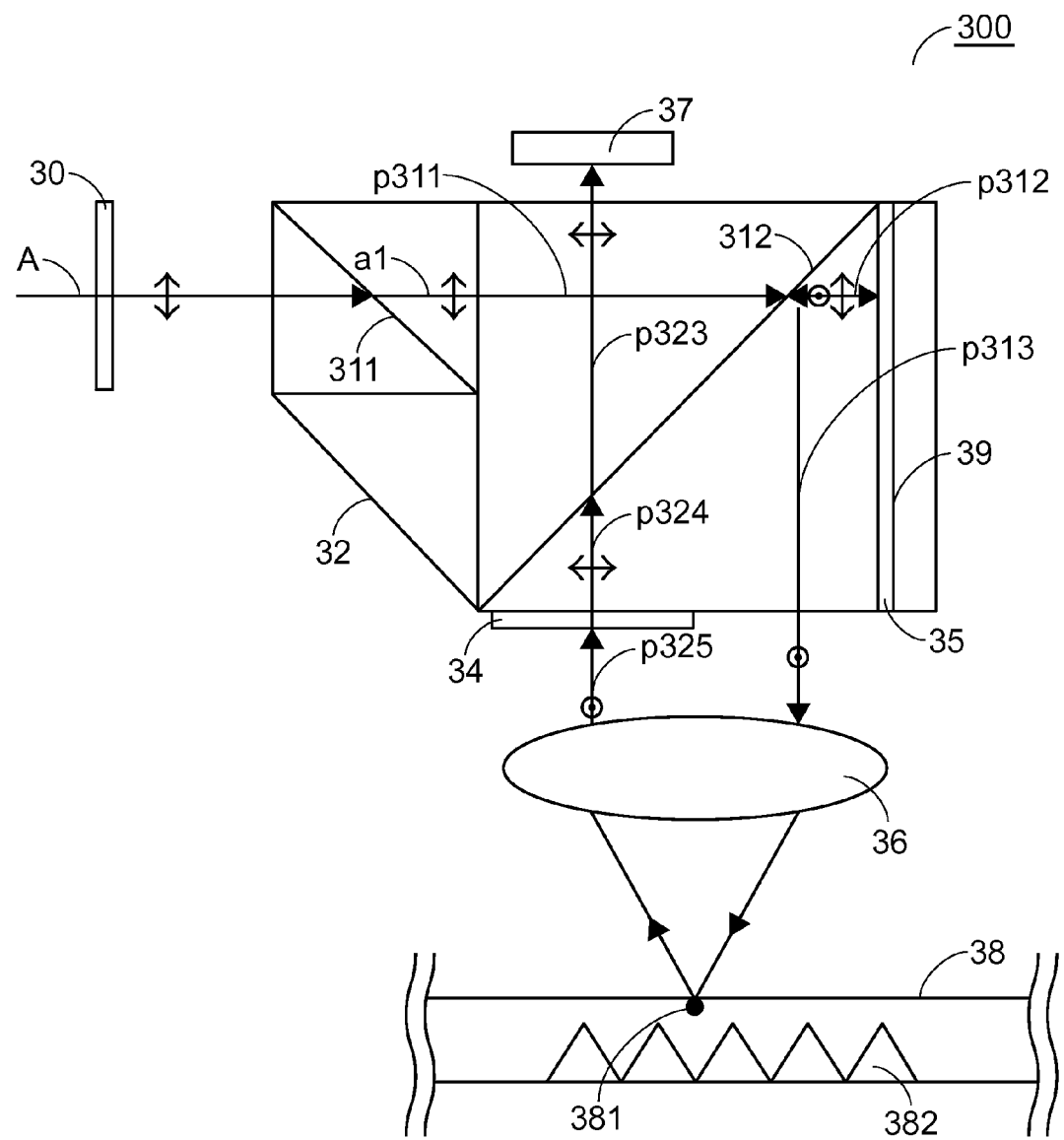

FIGS. 3A and 3B respectively illustrate two diagrams of the processes of data recording and data reading in a holographic optical accessing system 300 of the first embodiment. The holographic optical accessing system 300 includes a half-wave plate 30, PBS 311 (Polarizing Beam Splitter), prism 32, PBS 312, a quarter-wave plate 35, a reflective layer 39, LCOS 33, a half-wave plate 34, lens module 36, and a holographic optical disc 38, wherein all the related optical devices, e.g. the PBS 311 and 312, prism 32, the data plane (LCOS 33), the detecting apparatus, the reflector, and the beam splitter, are all composed to an optical assembly module.

In the process of data recording as depicted in FIG. 3A, the half-wave plate 30 is rotated to 22.5 degrees according to an orthogonal coordinate of a fast axis and a slow of the half-wave plat. As a result, the laser beam A with a p-polarization state and the laser beam A with an s-polarization state both are able to pass through the half-wave plate 30. After passed through the half-wave plate 30, the laser beam A is split to a first light beam a1 with a p-polarization state and a second light beam a2 with a s-polarization state by a PBS 311 (Polarizing Beam Splitter), wherein the p-polarization state has a 90-degree polarizing difference with the s-polarization state.

After split from the PBS 311, the second light beam a2 with a s-polarization state is reflected from p321 (path 321) to p322 (path 322) by a prism 32 (can be a Porro Prism), and further reflected from p322 to p323 by a PBS 312, and then finally emitted to a LCOS 33, wherein the LCOS 33 functions as a data plane with image information. The image information will be also contained in the second light beam a2 after the second light beam a2 is reflected by the LCOS 33, so as the second light beam a2 is regarded as a signal beam and the first light beam a1 is regarded as a reference beam. However, not only directly reflecting the incoming light beam, the LCOS 33 also provides a function for converting the polarization state of the incoming light beam. Therefore, the polarization state of the second light beam a2 is converted from s-polarization state to p-polarization state after the second light beam a2 is reflected by the LCOS 33.

The PBS also provides a function for spitting two light beams with different polarizations, which means a light beam will be reflected by the PBS if the light beam is with an s-polarization state and a light beam will be passed through the PBS if the light beam is with a p-polarization state. Therefore, the second light beam a2 (p-polarization) is able to pass through the PBS 312 from p323 to p324. In addition, because there is a half-wave plate 34 placed between the p324 and p325, the polarization state of the second light beam a2 is further converted from the p-polarization state to the s-polarization state after the second light beam a2 is passed through the half-wave plate 34.

Alternatively, because the first light beam a1 is with a p-polarization state, the first light beam a1 is able to pass through the PBS 312 from p311 to p312. There is a quarter-wave plate 35 and an aluminum reflective layer 39 placed on the end of the p312. The first light beam a1 is passed through the quarter-wave plate 35 twice because the first light beam a1 is reflected by the aluminum reflective layer 39. Because the behavior resulted from emitting a light beam through a quarter-wave plate twice is same as the behavior resulted from emitting the light beam through a half-wave plate one time, so as the polarization state of the first light beam a1 is converted from the p-polarization state to the s-polarization state after the first light beam a1 passed through the quarter-wave plate 35 twice. When the first light beam a1 (s-polarization) is emitted to the PBS 312, the first light beam a1 will not be passed through the PBS 312, but reflected by the PBS 312 from p312 to p313.

In the process of data recording, the first light beam a1 and the second light beam a2 are converted to a same type of polarization (s-polarization) by the optical assembly module, wherein the second light beam a2 is regarded as a signal beam because the image information presented on the LCOS 33 is also contained in the second light beam a2, and the first light beam a1 is regarded as a reference beam.

In addition, there is a holographic optical disc 38 used for recording data in the holographic optical accessing system 300 of the first embodiment. After the first light beam a1 and the second light beam a2 with the same type of polarization state (s-polarization) are both focused on the focal point 381 of the holographic optical disc 38 at the same time via the lens module 36, the interference stripes are formed on the focal point 381, so as the data recording process is completed.

Because the polarization state of the first light beam a1 is the same as the polarization state of the second light beam a2, and theses two light beams are parallel to each other rather than overlap with each other, the crosstalk generated in the conventional system is avoided in the first embodiment of the present invention.

In the process of data reading as depicted in FIG. 3B, the half-wave plate 30 is rotated from 22.5 degrees to 45 degrees for isolating the second light beam and making only the first light beam a1 with a p-polarization state able to pass through the half-wave plate 30 and the LCOS 33 is replaced by the CMOS 37, which functions as a detecting apparatus. Similar to the above-described data recording process depicted in FIG. 3A, the polarization state of the first light beam a1 on p311 is converted from the p-polarization state to the s-polarization state after the first light beam a1 is on p313. After the light beam a1 is further focused on the focal point 381 via the lens module 36, the light beam emitted from the holographic optical disc 38 is regarded as a data beam because the data recoded on the focal point 381 is also contained in the data beam.

As depicted in FIG. 3B, a plurality of micro-array devices 382 are integrated on the bottom of the holographic optical disc 38. The micro-array devices are awl-shaped arranged for reflecting the incoming light beam. That is to say, the data beam is further reflected to p325 by these micro-array devices 382 and emitted to the half-wave plate 34. The polarization state of the data beam on p324 is converted from the s-polarization state to the p-polarization state according to the function of the half-wave plate 34, therefore, the data beam with a p-polarization state is able to be pass through the PBS 312 from p324 to p323, and the data beam with data is finally received by the CMOS 37, so as the process of data reading is completed.

In addition, the holographic optical disc 38 with a plurality of micro-array devices can be replaced by a normal holographic optical disc adopting with a reflecting interface, wherein the reflecting interface includes a plurality of micro-array devices, and the reflecting interface is attached on the bottom of the holographic optical disc.

Figure 4A:
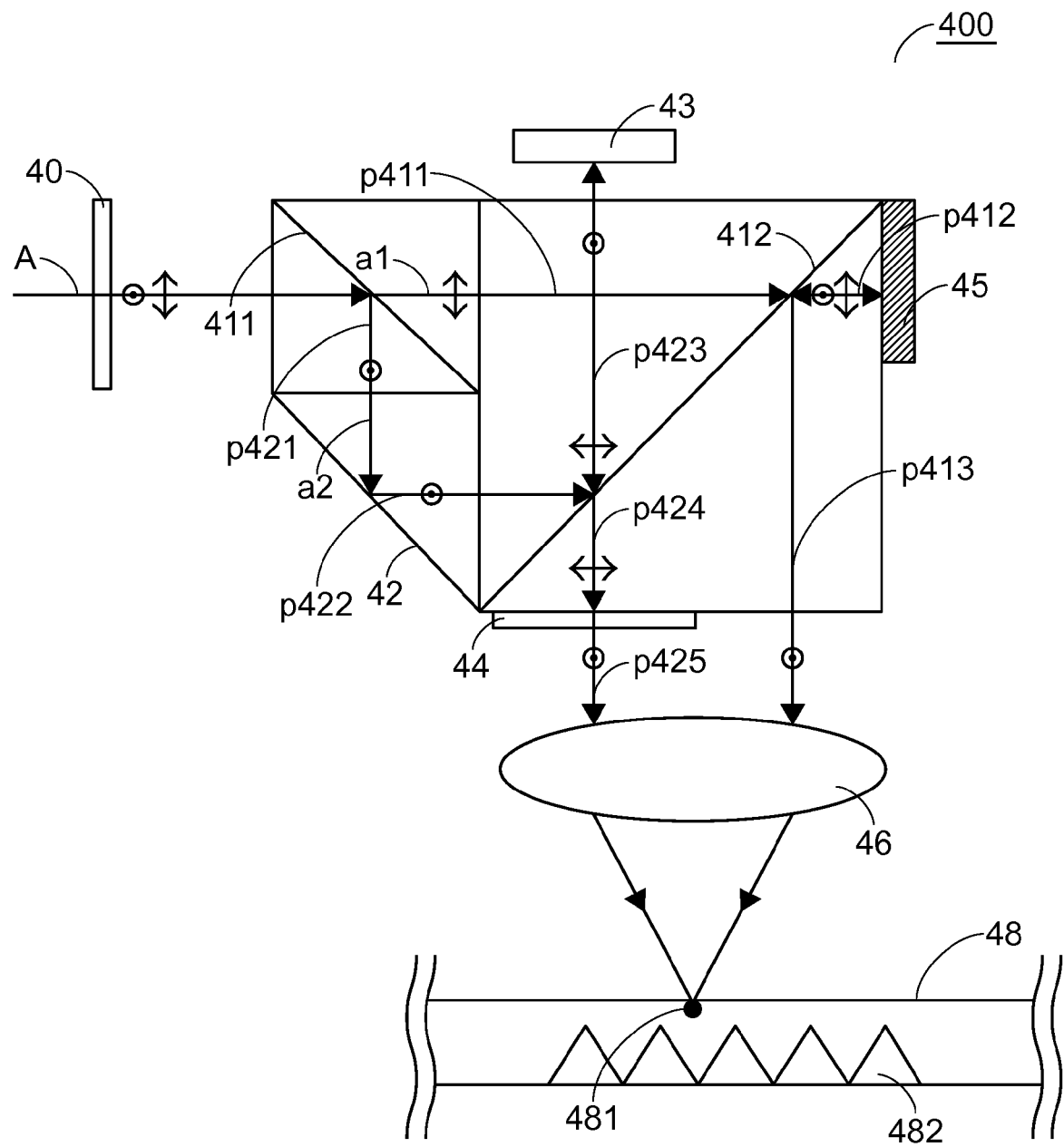
FIGS. 4A and 4B respectively illustrate two diagrams of the processes of data recording and data reading in a holographic optical accessing system in the second embodiment of the present invention.
Figure 4B:
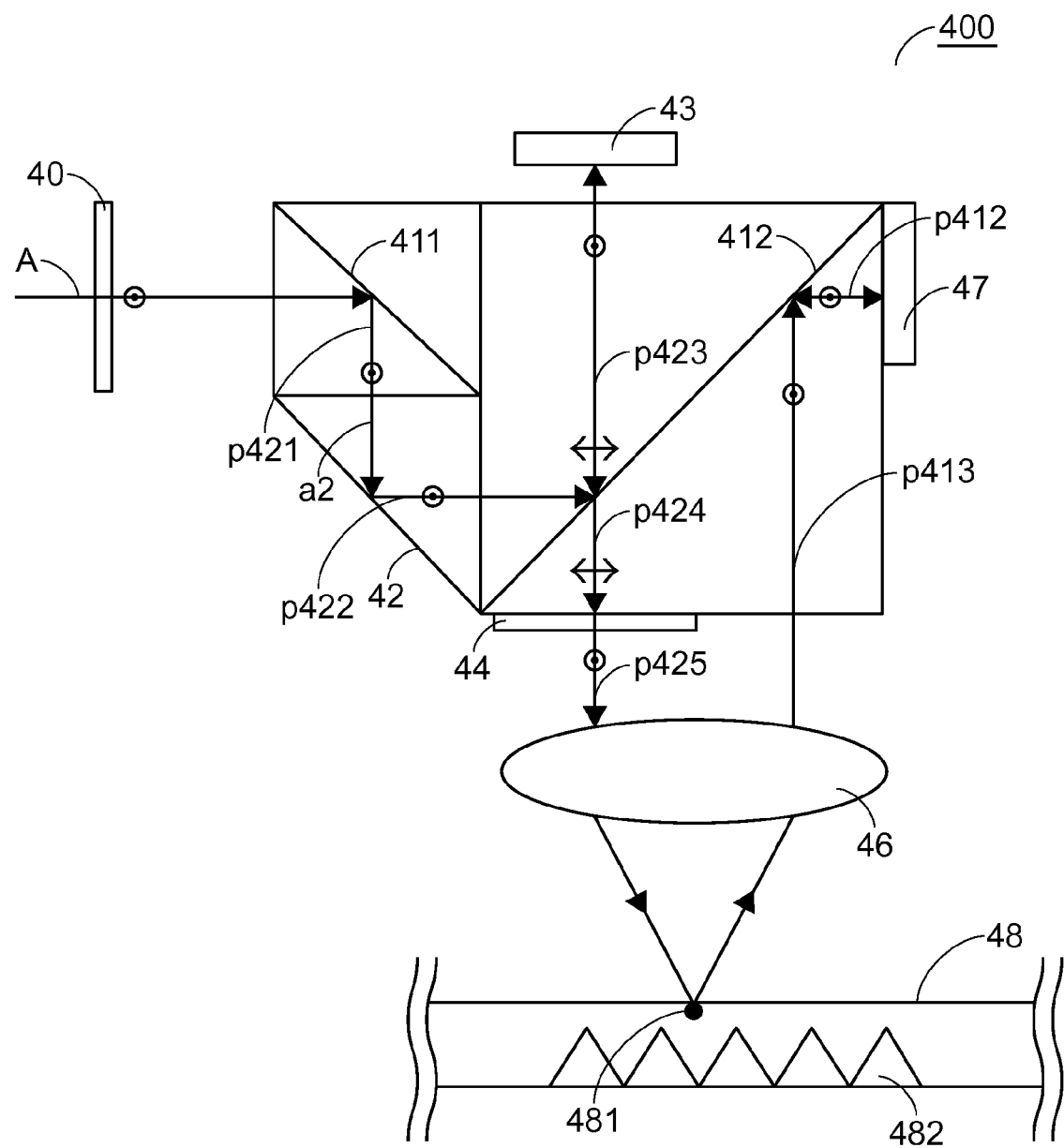

FIGS. 4A and 4B respectively illustrate two diagrams of the processes of data recording and data reading in a holographic optical accessing system 400 of the second embodiment. The holographic optical accessing system 400 includes a half-wave plate 40, PBS 411 (Polarizing Beam Splitter), prism 42, PBS 412, a LCOS 45, a LCOS 43, a half-wave plate 44, lens module 46, and a holographic optical disc 48, wherein all the related optical devices, e.g. the PBS 411 and 412, prism 42, the data plane (LCOS 45), the LSOC 43, are all composed to an optical assembly module.

In the process of data recording as depicted in FIG. 4A, the half-wave plate 40 is rotated to 22.5 degrees for making the laser beam A with a p-polarization state and the laser beam A with a s-polarization state both able to pass through the half-wave plate 40. The LCOS 45 can display images, which functions as a data plane with image information, and LCOS 43 having all displaying units displaying the light states, which functions for reflecting an incoming light beam and converting the polarization state of the incoming light beam.

Similar to the above-described data recording process depicted in FIG. 3A, the first light beam a1 is regarded as a signal beam after the first light beam a1 is emitted to the LCOS 45, so as the second light beam a2 is regarded as a reference beam. When the first light beam a1 with a s-polarization state and the second light beam a2 with a s-polarization state are both focused on the focal point 481 via the lens module 46 at the same time, the interference stripes are formed on the focal point 481, so as the data recording process is completed.

In the process of data reading as depicted in FIG. 4B, the CMOS 47 functions as a detecting apparatus, and the half-wave plate 40 is rotated from 22.5 degrees to 0 degree for isolating the first light beam and making only the second light beam a2 with a s-polarization state able to pass through the half-wave plate 40. As depicted in FIG. 4B, when the second light beam a2 (s-polarization) is reflected by the LCOS 43, the polarization state of the second light beam is converted from the s-polarization state to the p-polarization state, and the second light beam a2 with the p-polarization state is able to pass through the PBS 412. When the second light beam a2 is further focused on the focal point 481, the data recoded on the focal point 481 is also contained in the second light beam a2, so as the second light beam a2 will be regarded as a data beam. A plurality of micro-array device 482 is also placed on the bottom of the holographic optical disc 48. After the second light beam a2 is reflected by these micro-array devices 482, reflected by the PBS 412, and finally received by the CMOS 47, the process of data reading is completed.

Figure 4C:
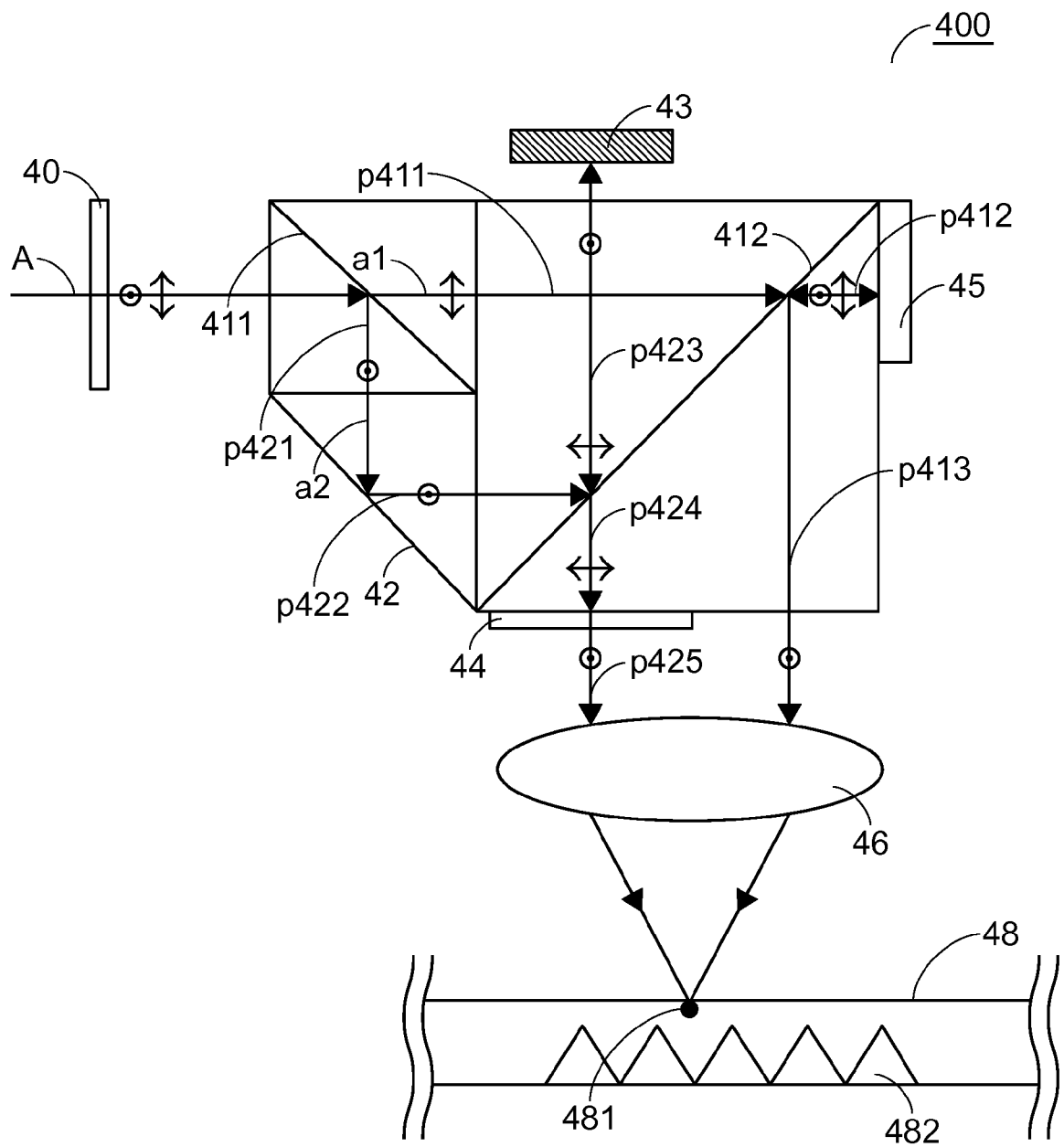
FIGS. 4C and 4D respectively illustrate two diagrams of processes of data recording and data reading modulated from the second embodiment.
Figure 4D:
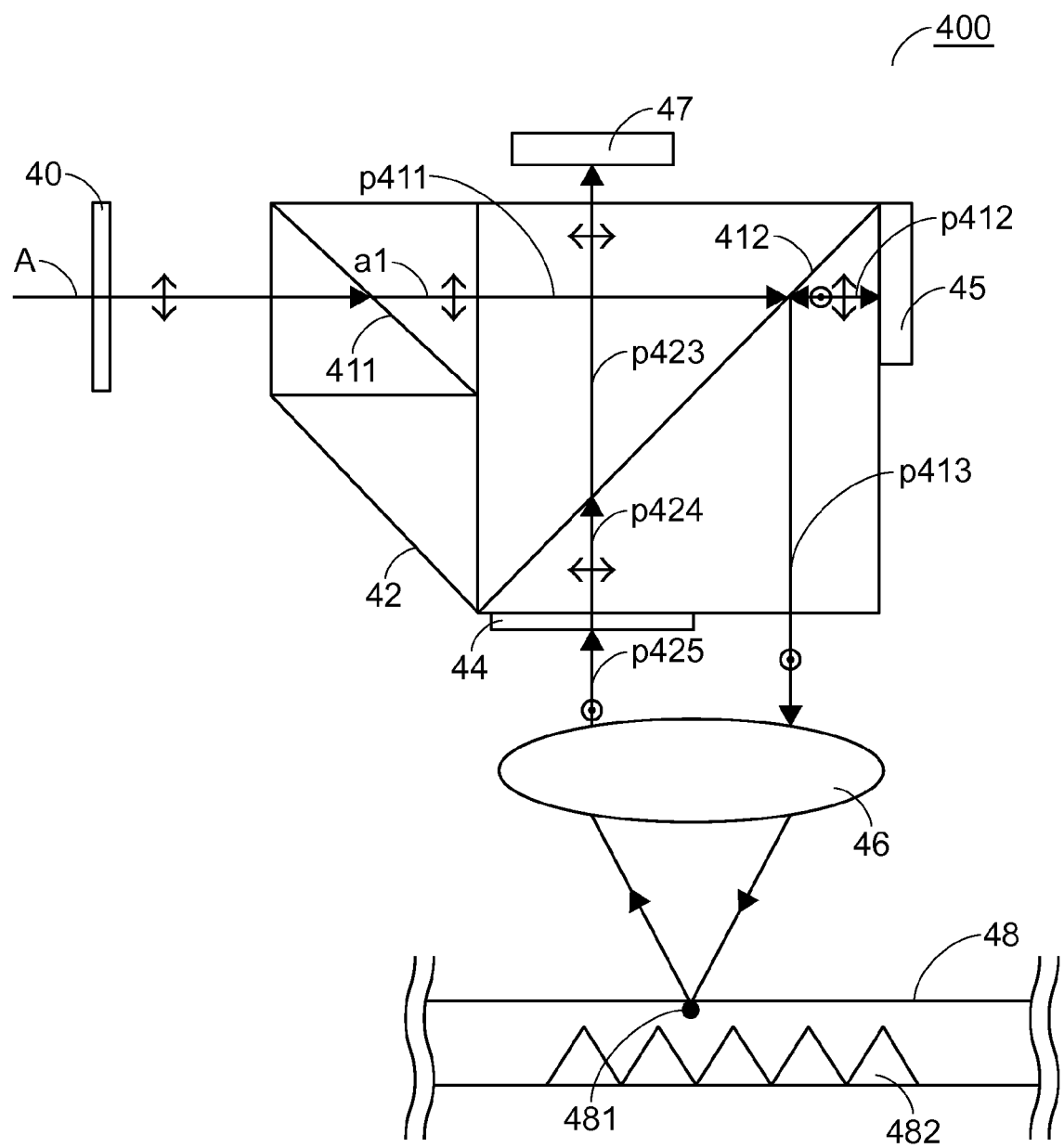

FIGS. 4C and 4D respectively illustrate two diagrams of processes of data recording and data reading modulated from the second embodiment. In the process of data recording depicted in the FIG. 4C, the LCOS 43 functions as a data plane with image information, the LCOS 45 functions for reflecting an incoming light beam and converting the polarization state of the incoming light beam. Also, the half-wave plate 40 is rotated to 22.5 degrees for making the laser beam A with a p-polarization state and the laser beam A with an s-polarization state both able to pass through the half-wave plate 40. Similar to the above-described data recording process depicted in FIG. 4A, the first light beam a1 is regarded as a reference beam on p413 and the second light beam a2 is regarded as a signal beam on p425. After the first light beam a1 (s-polarization) and the second light beam a2 (s-polarization) are both focused on the focal point 481 at the same time, the data recording process is completed.

In the process of data reading as depicted in FIG. 4D, the CMOS 47 functions as a detecting apparatus, and the half-wave plate 40 is rotated from 22.5 degrees to 45 degrees for isolating the second light beam and making only the first light beam a1 with a p-polarization state able to pass through the half-wave plate 40. Similar to the above-described data reading process depicted in FIG. 4B, the first light beam a1 is regarded as a data beam after the first light beam a1 is focused on the focal point 481, and after the first light beam a1 (p-polarization) is received by the CMOS 47, the data reading process is completed.

Figure 5A:
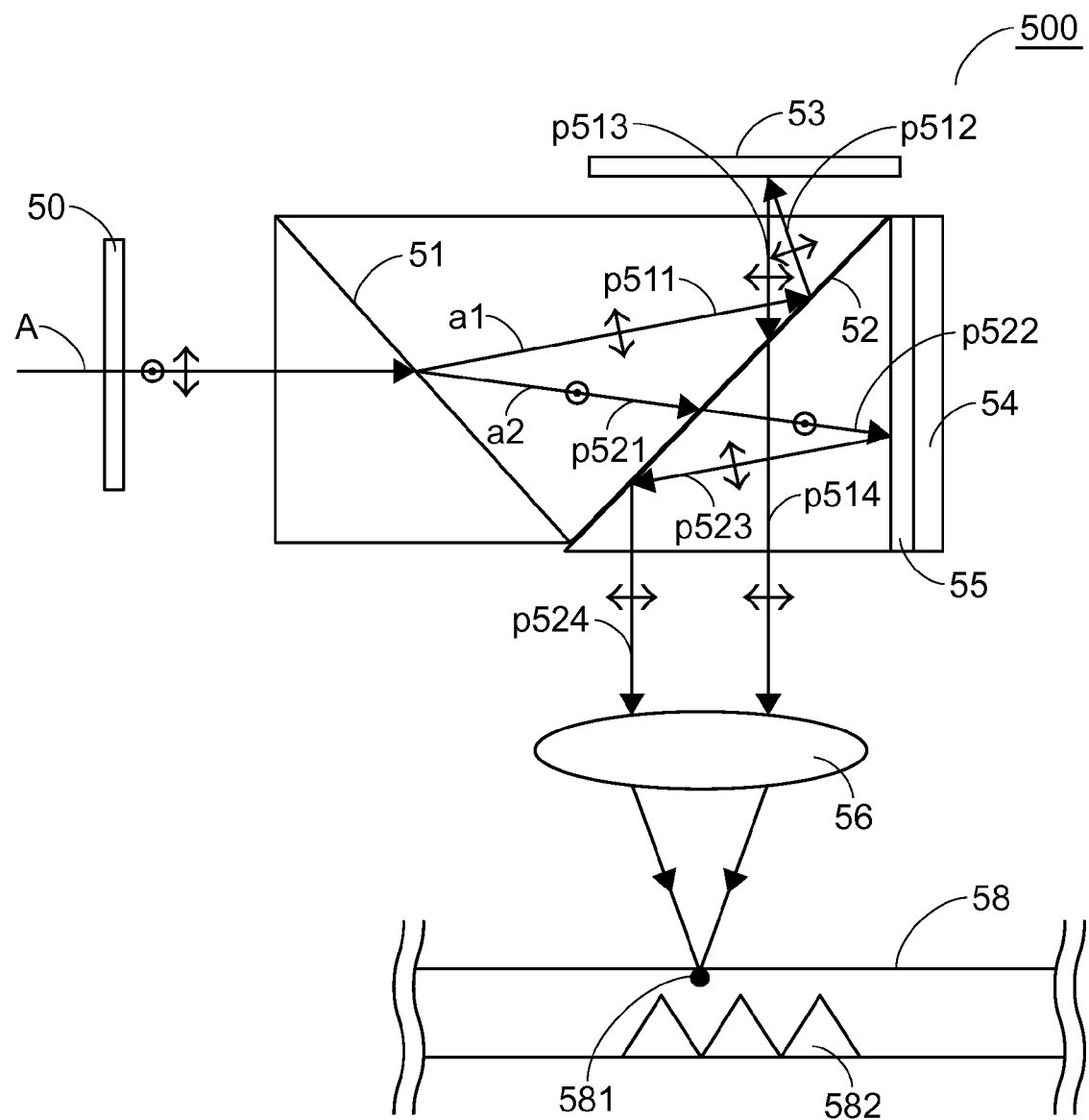
FIGS. 5A and 5B respectively illustrate two diagrams of the processes of data recording and data reading in a holographic optical accessing system in the third embodiment of the present invention.
Figure 5B:
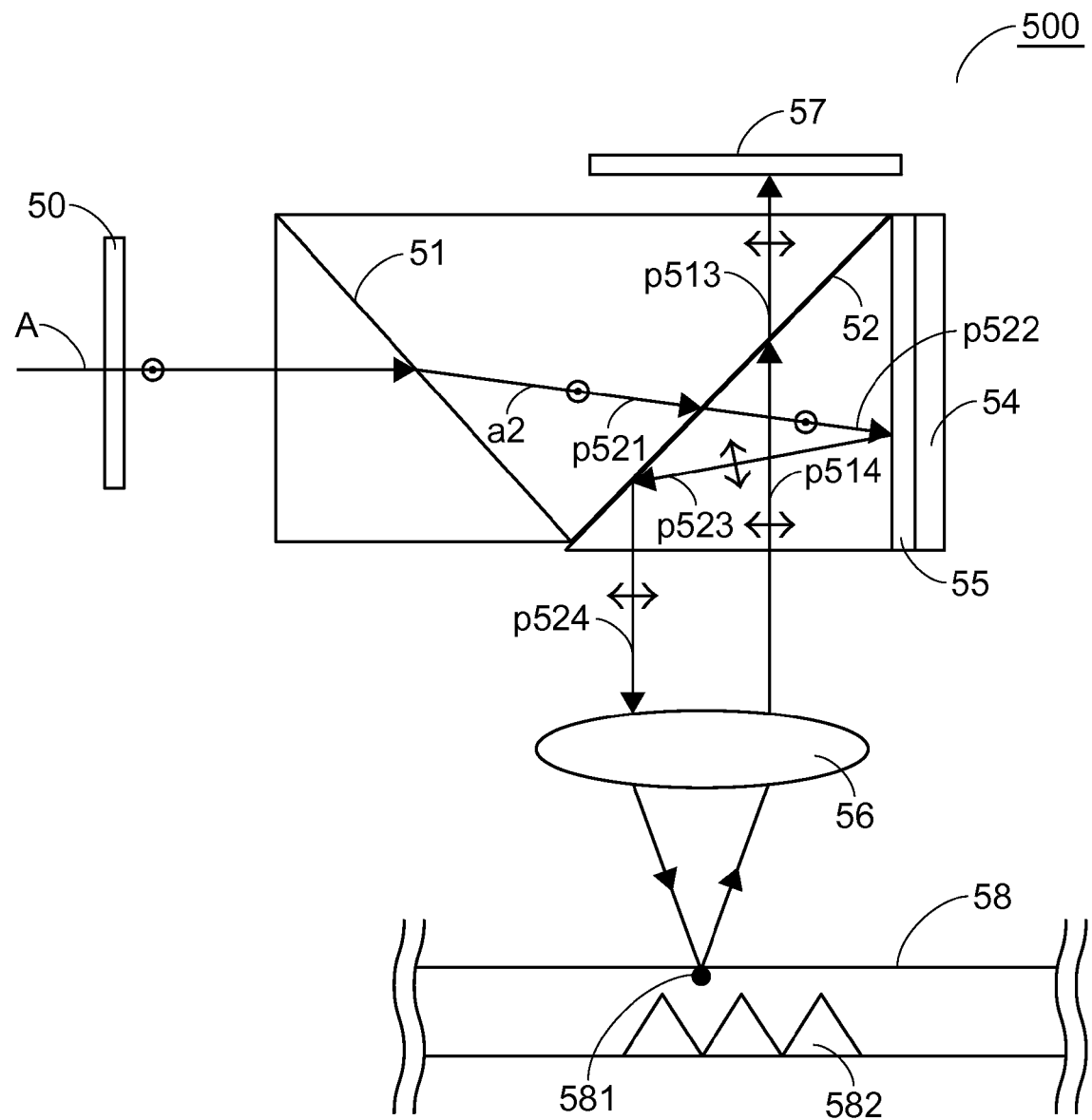

FIGS. 5A and 5B respectively illustrate two diagrams of the processes of data recording and data reading in a holographic optical accessing system 500 of the third embodiment.

The holographic optical accessing system 500 includes a half-wave plate 50, a beam splitter 51, a TIR prism 52 (Total Internal Reflection Prism), a DMD 53, a DMD 54, a quarter-wave plate 55, lens module 56, and a holographic optical disc 58, wherein all the related optical devices, e.g. the half-wave plate 50, the beam splitter 51, the TIR prism 52 (Total Internal Reflection Prism), the DMD 53, the DMD 54, the quarter-wave plate 55, are all composed to an optical assembly module.

In the process of data recording depicted in the FIG. 5A, the half-wave plate 50 is rotated to 22.5 degrees for making the laser beam A with a p-polarization state and the laser beam A with a s-polarization state both able to pass through the half-wave plate 40, and a splitter 51 (Wollaston Beam Splitter) functions for splitting a light source to two light beams with different polarization states and outputting the two light beams to two different directions. As depicted in the FIG. 5A, the first light beam a1 with a p-polarization state and the second light beam a2 with a s-polarization state are both emitted to a TIR Prism 52 (Total Internal Reflection Prism) from different directions (p511 and p521), wherein the TIR Prism 52 functions for reflecting an incoming beam if the incident angle of the incoming beam is larger than a fixed angle of the TIR Prism 52 and making the incoming beam passing through the TIR Prism 52 if the incident angle of the incoming beam is smaller than the fixed angle of the TIR Prism 52. As depicted in the FIG. 5A, because the incident angle of the first light beam a1 is larger than the fixed angle of the TIR Prism 52, the first light beam is reflected from p511 to p512 by the TIR 52, and then further emitted to a Digital Micro-mirror device 53 (DMD), wherein the DMD 53 functions as a data plane with image information and the DMD 53 can also totally reflect the incoming light beam from p512 to p513 without changing the polarization state of the incoming light beam. The first light beam a1 is regarded as a signal beam after the first light beam a1 is emitted to the DMD 53, so as the second light beam a2 is regarded as a reference beam. In addition, as depicted in FIG. 5A, the first light beam a1 is further pass through the TIR 52 from p513 to p514 because the incident angle of the first light beam a1 is smaller than the fixed angle of the TIR 52.

Alternatively, because the incident angle of the second light beam a2 is smaller than the fixed angle of the TIR 52, the second light beam a2 is able to pass through the TIR 52 from the p521 to p522, and then further emitted to the quarter-wave plate 55. As depicted in FIG. 5A, there is a DMD 54 placed on one side of the quarter-wave plate 55, wherein the quarter-wave plate 55 functions for converting the polarization state of the incoming light beam and the DMD 54 functions for reflecting the incoming light beam. After the second light beam a2 is reflected from p522 to p523, the polarization state of the second light beam a2 is converted from the s-polarization state to the p-polarization state, and the second light beam a2 with a p-polarization state is further reflected from p523 to p524 by the TIR 52 because the incident angle of the second light beam a2 is larger than the fixed angle of the TIR 52. After the first light beam a1 (p-polarization) and the second light beam a2 (p-polarization) are both focused on the focal point 581 at the same time, the data recording process is completed.

In the process of data reading as depicted in FIG. 5B, the half-wave plate 50 is rotated from 22.5 degrees to 0 degree for isolating the first light beam and making only the second light beam a2 with a s-polarization state able to pass through the half-wave plate 50, and the CMOS 57 functions as a detecting apparatus. As depicted in FIG. 5B, after the light beam a2 is emitted through the TIR 52 and further reflected from p522 to p523 by the quarter-wave plate 55 and the DMD 54, the polarization of the second light beam a2 is converted from the s-polarization state to the p-polarization state. After the second light beam a2 is focused on the focal point 581, the second light beam a2 is regarded as a data beam. When the second light beam a2 (p-polarization) is received by the CMOS 57, the data reading process is completed.

Figure 5C:
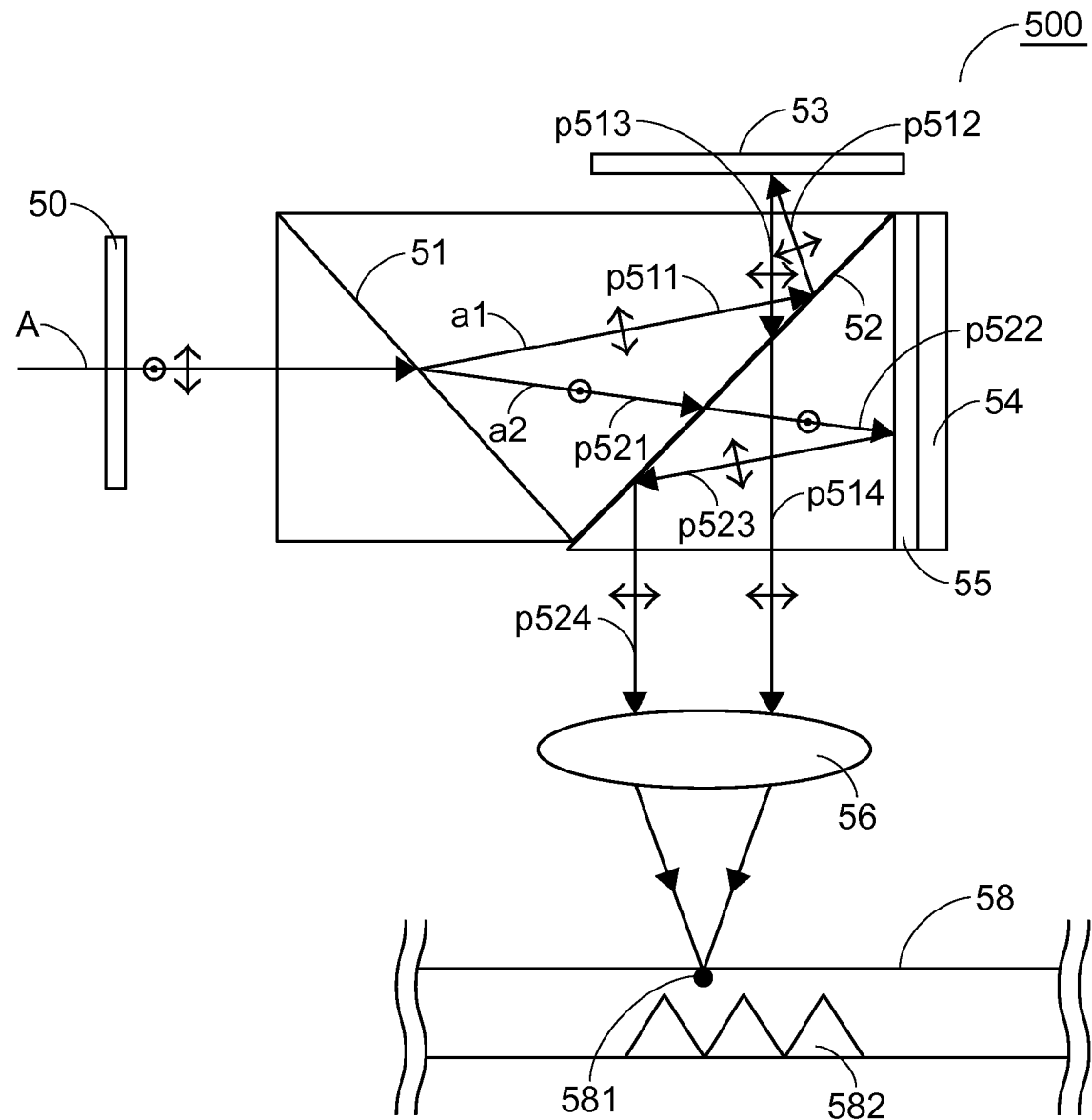
FIGS. 5C and 5D respectively illustrate two diagrams of processes of data recording and data reading modulated from the third embodiment.
Figure 5D:
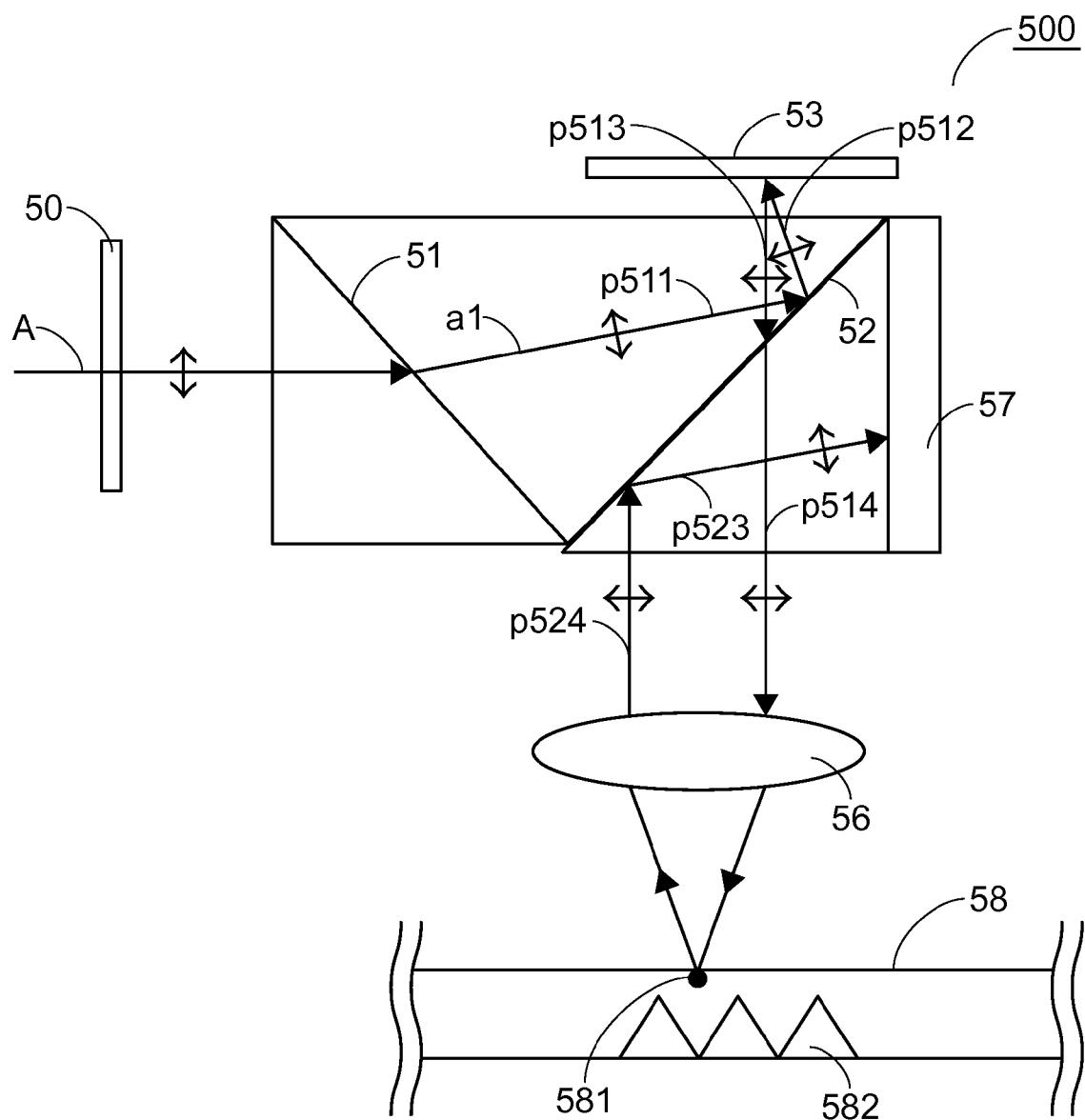

FIGS. 5C and 5D respectively illustrate two diagrams of processes of data recording and data reading modulated from the third embodiment. In the process of data recording depicted in the FIG. 5C, the DMD 53 functions as a mirror, the DMD 54 functions as a data plane with image information, and the half-wave plate 50 is rotated to 22.5 degrees for making the laser beam A with a p-polarization state and the laser beam A with a s-polarization state both able to pass through the half-wave plate 50. Similar to the above descriptions in the process of data recording of the third embodiment depicted in FIG. 5A, the second light beam a2 is regarded as a signal beam after the second light beam a2 is emitted to the DMD 54, so as the first light beam a1 is regarded as a reference beam. After the first light beam a1 (p-polarization) and the second light beam a2 (p-polarization) are both focused on the focal point 581 at the same time, the data recording process is completed.

In the process of data reading as depicted in FIG. 5D, the half-wave plate 50 is rotated from 25 degrees to 45 degrees for isolating the second light beam and making only the first light beam a1 with a p-polarization state able to pass through the half-wave plate 50, and the CMOS 57 functions as a detecting apparatus. Similar to the above descriptions in the process of data reading of the third embodiment depicted in FIG. 5B, the first light beam a1 is regarded as a data beam after the first light beam a1 is focused on the focal point 581. After the first light beam a1 (p-polarization) is received by the CMOS 57, the data reading process is completed.

Figure 6A:
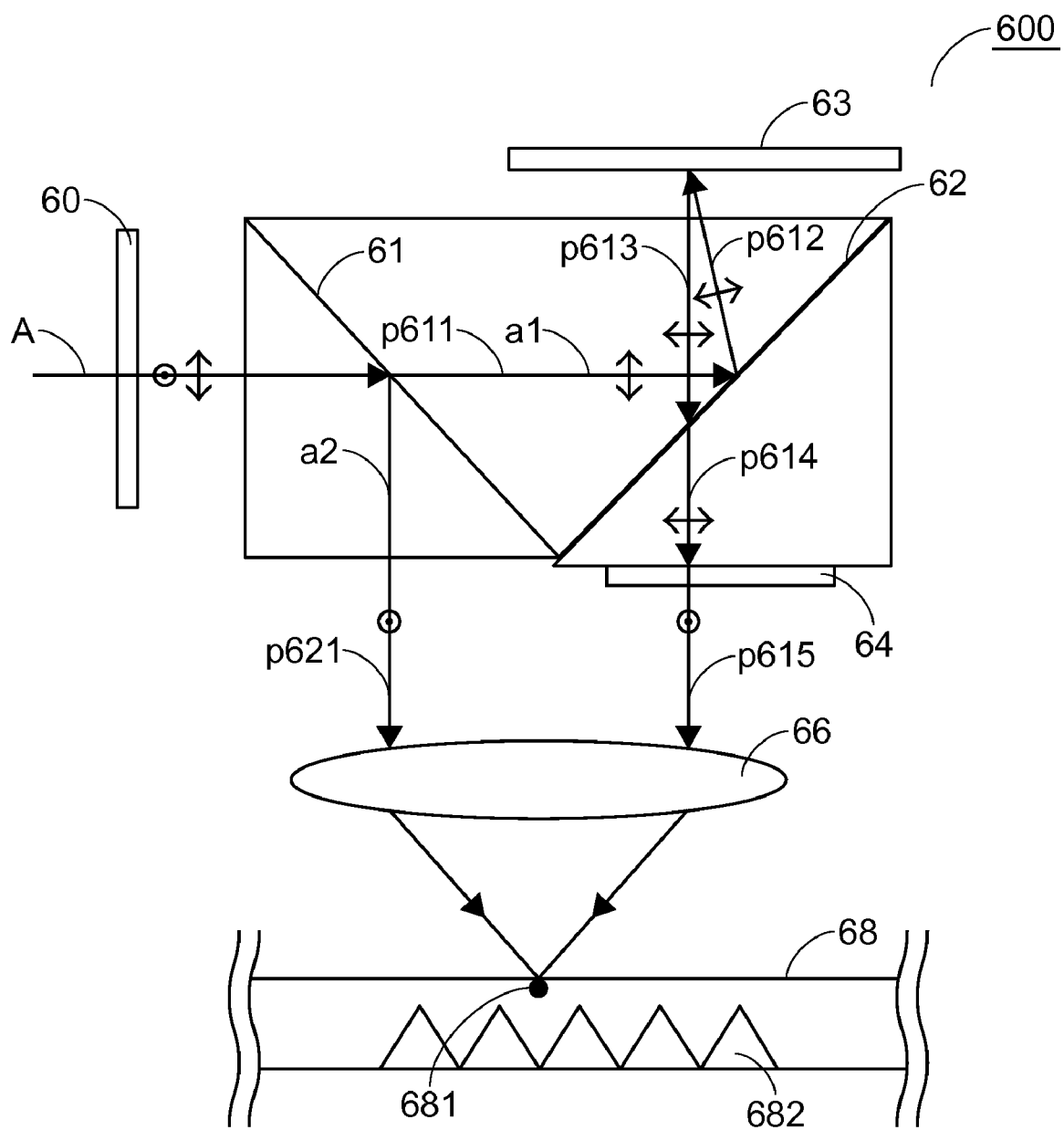
FIGS. 6A and 6B respectively illustrate two diagrams of the processes of data recording and data reading in a holographic optical accessing system in the fourth embodiment of the present invention.
Figure 6B:
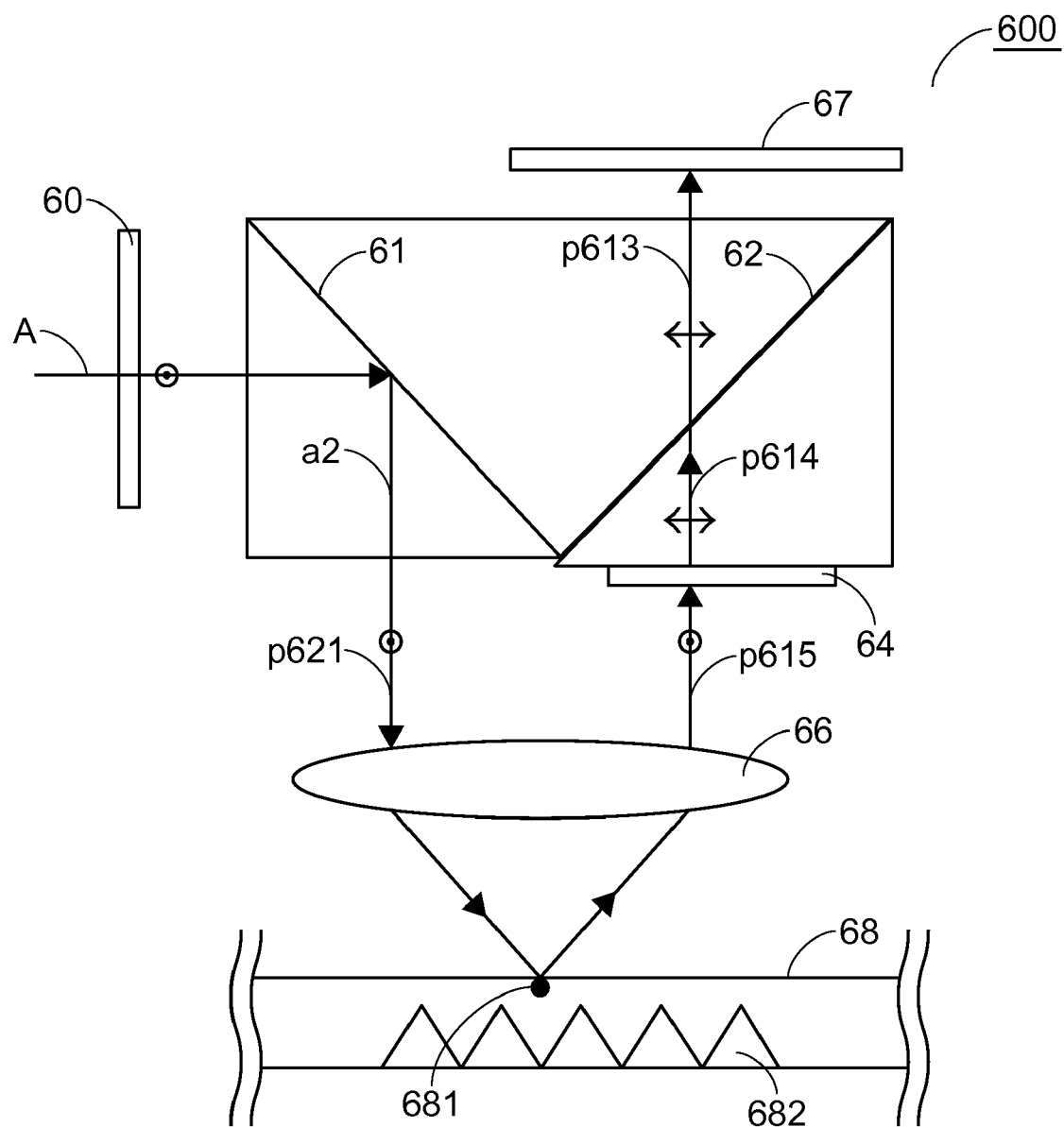

FIGS. 6A and 6B respectively illustrate two diagrams of the processes of data recording and data reading in a holographic optical accessing system 600 of the fourth embodiment. The holographic optical accessing system 600 includes a half-wave plate 60, a PBS 61 (Polarizing Beam Splitter), a TIR 62, a DMD 63, a half-wave plate 64, a lens module 66, and a holographic optical disc 68, wherein all the related optical devices, e.g. the half-wave plate 60, the PBS 61 (Polarizing Beam Splitter), the TIR 62, the DMD 63, the half-wave plate 64, are all composed to an optical assembly module.

In the process of data recording depicted in the FIG. 6A, the half-wave plate 60 is rotated to 22.5 degrees for making the laser beam A with a p-polarization state and the laser beam A with a s-polarization state both able to pass through the half-wave plate 60, the half-wave plate 64 functions for converting the polarization state of an incoming light beam, and the DMD 63 functions as a data plane with image information. As depicted in FIG. 6A, the laser beam A is split to a first light beam a1 with a p-polarization state and a second light beam a2 with a s-polarization state by the PBS 61, wherein the first light beam a1 is regarded as a signal beam after the first light beam a1 is emitted to the DMD 63, so as the second light beam a2 is regarded as reference beam. As depicted in FIG. 6A, the first light beam a1 is reflected by the TIR 62 from p611 to p612 according to the incident angle of the first light beam a1 is larger than the fixed angle of the TIR 62, and then is further passed through the TIR 62 from p613 to p614 according to the incident angle of the first light beam a1 is smaller than the fixed angle of the TIR 62. After the first light beam a1 is passed through the half-wave plate 64, the polarization of the first light beam a1 is changed from the p-polarization state to the s-polarization state. After the first light beam a1 (s-polarization) and the second light beam a2 (s-polarization) are both focused on the focal point 681 at the same time, the data recording process is completed.

In the process of data reading as depicted in FIG. 6B, the half-wave plate 60 is rotated from 22.5 degrees to 45 degrees for isolating the first light beam and making only the second light beam a2 with a s-polarization state able to pass through the half-wave plate 60, and the CMOS 67 functions as a detecting apparatus. As depicted in FIG. 6B, the second light beam a2 is regarded as a data beam after the second light beam a2 is focused on the focal point 681. The polarization state of the second light beam is converted from the s-polarization state to the p-polarization state after the second light beam a2 is pass through the half-wave plate 64. After the second light beam a2 (p-polarization) is received by the DMD 67, the data reading process is completed.

Figure 7A:
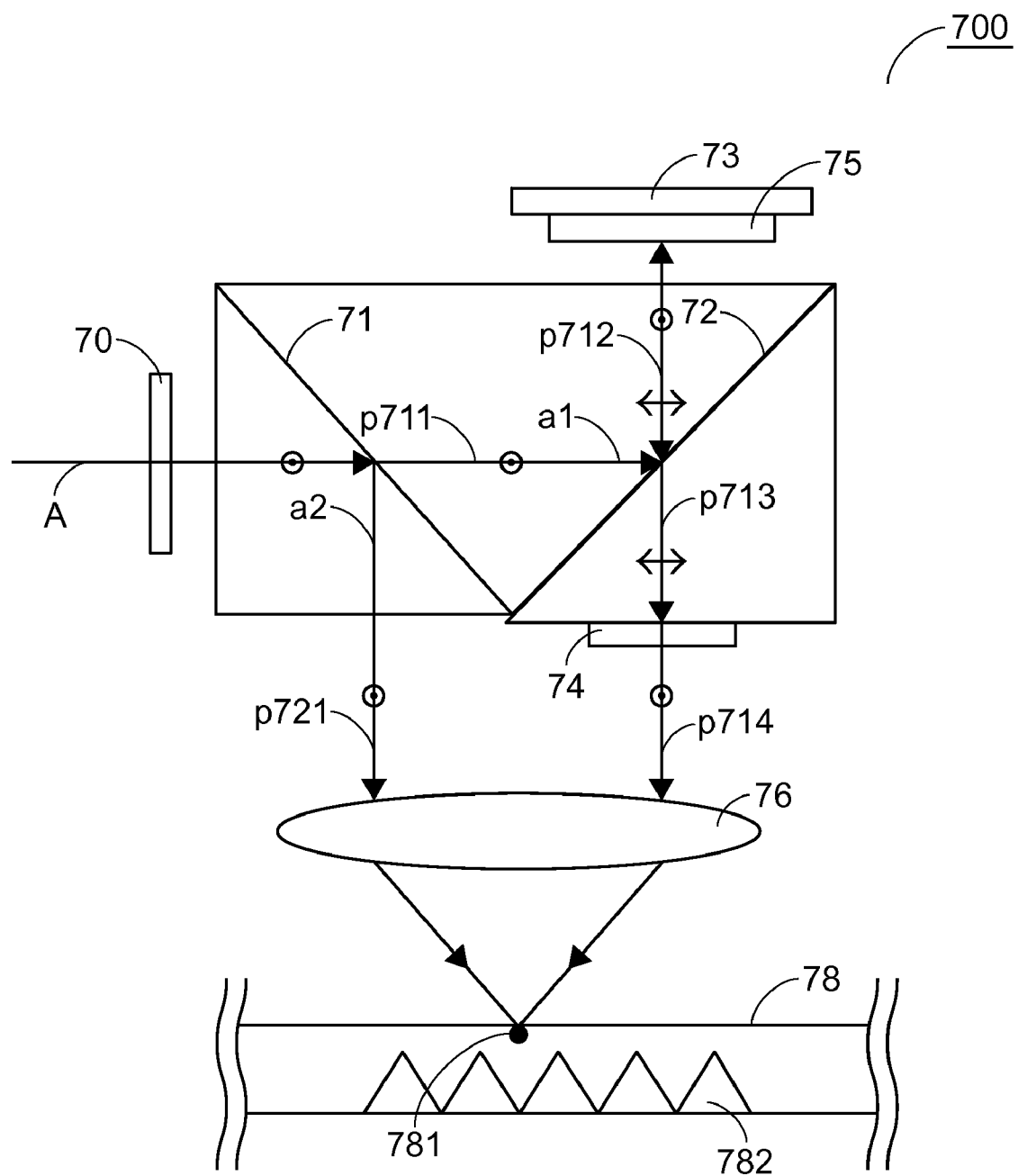
FIGS. 7A and 7B respectively illustrate two diagrams of the processes of data recording and data reading in a holographic optical accessing system in the fifth embodiment of the present invention.
Figure 7B:
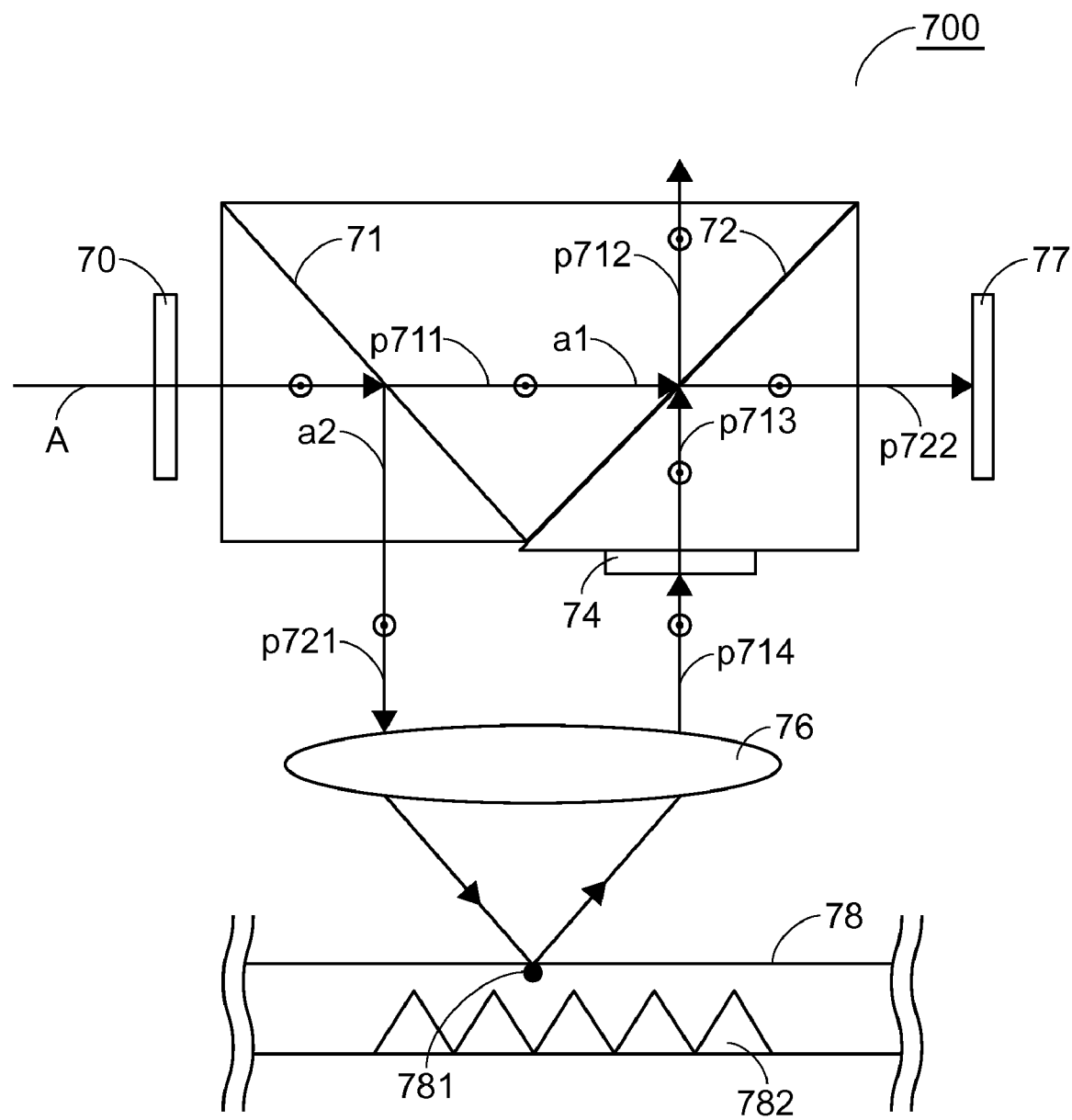

FIGS. 7A and 7B respectively illustrate two diagrams of the processes of data recording and data reading in a holographic optical accessing system 700 of the fifth embodiment. The holographic optical accessing system 700 includes a half-wave plate 70, PDBS 71 (Polarizing Double Beam Splitter), a PBS 72 (Polarizing Beam Splitter), a DMD 73, a quarter-wave plate 75, a half-wave plate 74, a lens module 76, and a holographic optical disc 78, wherein all the related optical devices, e.g. the half-wave plate 70, the PDBS 71 (Polarizing Double Beam Splitter), the PBS 72 (Polarizing Beam Splitter), the DMD 73, the quarter-wave plate 75, the half-wave plate 74, are all composed to an optical assembly module.

The half-wave plate 70 functions for making only a laser beam A with a s-polarization state able to pass through the half-wave plate 70, and the PDBS 71 (Polarizing Double Beam Splitter) functions for splitting the light beam A with a s-polarization state to a first light beam a1 with a s-polarization state and a second light beam a2 with a s-polarization state.

In the process of data recording as depicted in FIG. 7A, the DMD 73 functions as a data plane with image information and the half-wave plate 74 is rotated to 45 degrees for converting the polarization of an incoming light beam. As depicted in FIG. 7A, after the first light beam a1 with a s-polarization state is emitted to the DMD 73 with image information, the first light beam a1 is regarded as a signal beam, so as the second light beam a2 is regarded as a reference beam. After the first light beam a1 is emitted through the quarter-wave plate 75, the polarization state of the first light beam a1 is converted from the s-polarization state to the p-polarization state. After the first light beam a1 with the p-polarization state is passed through the half-wave plate 74, the polarization state of the first light beam a1 is further converted from the p-polarization state to the s-polarization state. After the first light beam a1 (s-polarization) and the second light beam a2 (s-polarization) are both focused on the focal point 781 at the same time, the data recording process is completed.

In the process of data reading as depicted in FIG. 7(b), the quarter-wave plate 75 and the DMD 73 depicted in FIG. 7(a) are removed, the CMOS 77 is added and functions as a detecting apparatus, and the half-wave plate 74 is rotated from 45 degrees to 0 degree for unable changing the polarization of the incoming light beam. As depicted in FIG. 7B, the second light beam a2 with a s-polarization state is regarded as a data beam after the second light beam a2 is focused on the focal point 781, and the second light beam a2 is still with the s-polarization state on p713 according to the half-wave plate 74 is rotated to 0 degree. In addition, after reflected by the PBS 71, the first light beam a1 is not received because the quarter-wave plate 75 and the DMD 73 are removed. After the second light beam a2 (s-polarization) is further reflected by the PBS 72 to p722 and received by the CMOS 77, the process of data reading is completed.

According to the above descriptions of the five embodiments of the present invention, the crosstalk interference resulted by the reference beam and the signal beam within the conventional holographic optical accessing system can be avoided by the optical assembly module within the five embodiments for converting the signal beam and the reference beam to have different optical axes.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A holographic optical accessing system including:
    a light source, for emitting a first light beam;
    a beam splitter, for splitting the first light beam into a second light beam and a third light beam, wherein a polarization state of the second light beam is different from the polarization state of the third light beam;
    an optical assembly module, for converting the second light beam and the third light beam to have the same polarization state and making the optical axes of the second light beam and the third light beam parallel to each other rather than overlapped with each other during a process of data recording, and for only outputting the third light beam during a process of data reading;
    a lens module, for focusing the second light beam and the third light beam on a focal point at a same time during the process of data recording, and for only focusing the third light beam on the focal point during the process of data reading;
    a storage medium, for forming the focal point in the storage medium during the process of data recording, and for converting the third light beam to a data beam during the process of data reading; and
    an awl-shaped interface, for reflecting the data beam and inputting the data beam to the optical assembly module from the opposite direction of the second light beam.

2. The holographic optical accessing system according to claim 1, wherein the storage medium and the awl-shaped interface are combined to a holographic optical disc.

3. The holographic optical accessing system according to claim 1, wherein the awl-shaped interface includes a plurality of micro-array devices.

4. The holographic optical accessing system according to claim 1, wherein the different polarization states includes a p-polarization state and an s-polarization state, and the p-polarization state has a 90-degree polarizing difference with the s-polarization state.

5. The holographic optical accessing system according to claim 1, wherein the optical assembly module further includes a data plane for displaying an image information, and makes the second light beam containing the image information during the process of data recording.

6. The holographic optical accessing system according to claim 1, wherein the optical assembly module further includes a detecting apparatus for receiving the data beam.

7. A holographic optical accessing system including:
    a light source, for emitting a first light beam, wherein the first light beam can be distinguished to a second light beam and a third light beam, and a polarization state of the second light beam is different from the polarization state of the third light beam;
    a half-wave plate, for passing the second light beam and the third light beam when the half-wave plate is rotated to a first angle during a process of data recording, and for only passing the third light beam when the half-wave plate is rotated to a second angle during a process of data reading;
    a beam splitter, for splitting the second light beam and the third light beam during the process of data recording, and for outputting the third light beam during the process of data reading;
    an optical assembly module, for converting the second light beam and the third light beam to the same first polarization state and making the second light beam and the third light beam light beams being parallel to each other rather than being overlapped with each other during the process of data recording, and for only outputting the third light beam during the process of data reading;
    a lens module, for focusing the second light beam and the third light beam on a focal point at the same time during the process of data recording, and for focusing the third light beam on the focal point during the process of data reading;
    a storage medium, for forming the focal point in the storage medium during the process of data recording, and for converting the third light beam to a data beam during the process of data reading; and
    An awl-shaped interface, for reflecting the data beam and inputting the data beam into the optical assembly module from the opposite direction of the second light beam.

8. The holographic optical accessing system according to claim 7, wherein the storage medium and the awl-shaped interface are combined to a holographic optical disc.

9. The holographic optical accessing system according to claim 7, wherein the awl-shaped interface includes a plurality of micro-array devices.

10. The holographic optical accessing system according to claim 7, wherein the different polarization states includes a p-polarization state and an s-polarization state, and the p-polarization state has a 90-degree polarizing difference with the s-polarization state.

11. The holographic optical accessing system according to claim 7, wherein the optical assembly module further includes a data plane for displaying an image information, and makes the second light beam contain the image information during the process of data recording.

12. The holographic optical accessing system according to claim 7, wherein the optical assembly module further includes a detecting apparatus for receiving the data beam.

13. The holographic optical accessing system according to claim 7, wherein the first angle is 22.5 degrees rotated from an axis of the first light beam, the second angle is 0 degree or 45 degrees rotated from the axis of first light beam.

14. A holographic optical accessing system including:
    a light source, for emitting a first light beam;
    a half-wave plate, for passing the first light beam with a first polarization state;
    a beam splitter, for splitting the first light beam with the first polarization state to a second light beam and a third light beam;
    an optical assembly module, for making the second light beam and the third light beam being parallel to each other rather than being overlapped with each other during a process of data recording, and for only outputting the third light beam during a process of data reading;

a lens module, for focusing the second light beam and the third light beam on a focal point during the process of data recording, and for focusing the third light beam on the focal point during the process of data reading;

a storage medium, for forming the focal point in the storage medium during the process of data recording, and for converting the third light beam to a data beam during the process of data reading; and An awl-shaped interface, for reflecting the data beam and inputting the data beam to the optical assembly module from the opposite direction of the second light beam.

15. The holographic optical accessing system according to claim 14, wherein the storage medium and the awl-shaped interface are combined to a holographic optical disc.

16. The holographic optical accessing system according to claim 14, wherein the awl-shaped interface includes a plurality of micro-array devices.

17. The holographic optical accessing system according to claim 14, wherein the first polarization state is a p-polarization state or a s-polarization state, and the p-polarization state has a 90-degree polarizing difference with the s-polarization state.

18. The holographic optical accessing system according to claim 14, wherein the optical assembly module further includes a data plane for displaying an image information, and makes the second light beam contain the image information during the process of data recording.

19. The holographic optical accessing system according to claim 14, wherein the optical assembly module further includes a detecting apparatus for receiving the data beam.

20. A holographic optical accessing system including:

a light source, for emitting a light beam;

an optical assembly module, for receiving the light beam to generate a signal beam and a reference beam, wherein the signal beam and the reference beam are parallel to each other rather than overlap with each other, and the signal beam and the reference beam have a first polarization state;

a lens module, for focusing the signal beam and the reference beam on a focal point at the same time; and a storage medium, for recording the focal point;

wherein the optical assembly module includes at least a data plane for displaying an image information and makes the signal beam contain the image information.

21. The holographic optical accessing system according to claim 20, wherein the first polarization state is a p-polarization state or a s-polarization state, and the p-polarization state has a 90-degree polarizing difference with the s-polarization state.

22. A holographic optical accessing system including:

a light source, for emitting a light beam;

an optical assembly module, for receiving the light beam and converting the light beam to a signal beam and a reference beam during a process of data recording, and for receiving the light beam and converting the light beam to a reference beam during a process of data reading, wherein the signal beam and the reference beam are parallel to each other rather than overlap with each other, and the signal beam and the reference beam have a first polarization state;

a lens module, for focusing the signal beam and the reference beam on a focal point during the process of data recording, and for focusing the reference beam on the focal point during the process of data reading;

a storage medium, for forming the focal point in the storage medium during the process of data recording, and for converting the reference beam to a data beam during the process of data reading; and An awl-shaped interface, for reflecting the data beam and inputting the data beam to the optical assembly module from the opposite direction of the signal beam.

23. The holographic optical accessing system according to claim 22, wherein the storage medium and the awl-shaped interface are combined to a holographic optical disc.

24. The holographic optical accessing system according to claim 22, wherein the awl-shaped interface includes a plurality of micro-array devices.

25. The holographic optical accessing system according to claim 22, wherein the first polarization state is a p-polarization state or a s-polarization state, and the p-polarization state has a 90-degree polarizing difference with the s-polarization state.

26. The holographic optical accessing system according to claim 22, wherein the optical assembly module further includes a data plane for displaying an image information, and makes the second light beam contain the image information during the process of data recording.

27. The holographic optical accessing system according to claim 22, wherein the optical assembly module further includes a detecting apparatus for receiving the data beam.

* * * * *